United States Patent [19]
Armanno

[11] 3,916,556
[45] Nov. 4, 1975

[54] MULTIPURPOSE FISHING DEVICE

[76] Inventor: Frank Armanno, 7 Gemini Lane, Nesconset, N.Y. 11767

[22] Filed: Nov. 18, 1974

[21] Appl. No.: 524,644

Related U.S. Application Data

[63] Continuation-in-part of Ser. No. 457,624, April 3, 1974, abandoned.

[52] U.S. Cl. .............................. 43/42.06; 43/42.22
[51] Int. Cl.² .......................................... A01K 85/00
[58] Field of Search ............. 43/42.06, 42.22, 42.39, 43/42.35, 42.31, 42.32

[56] References Cited
UNITED STATES PATENTS

| | | | |
|---|---|---|---|
| 2,532,879 | 12/1950 | Baker | 43/42.06 |
| 2,563,386 | 8/1951 | Wight, Jr. | 43/42.22 |
| 2,994,982 | 8/1961 | Murawski | 43/42.35 |
| 3,505,754 | 4/1970 | Lawlor | 43/42.22 |

*Primary Examiner*—Warner H. Camp
*Attorney, Agent, or Firm*—Leonard H. King

[57] ABSTRACT

A body portion has two separable sections that may be secured to each other by mating threads. The forward section is perforated and is adapted to function as a bait chamber. The rearward section, which is adapted to function as a ballast chamber, is fluid impermeable and is sealed from the forward section by means of a transversely positioned gasket. A plurality of fins mounted on the external surface of the rearward section provide means for controlling the direction of movement of the device. At least some of the fins are fixed in place while other of the fins are angularly displacable. A piston that is adapted to be connected to the fishing line which extends through the forwardmost end of the wall of the forward chamber is used to selectively discharge the contents thereof. The external surface of the forward and rearward sections may be made of the same color or of different colors. The device may be made of any suitable material such as rubber, plastics, synthetic resin or appropriate metals or the external surface may be made of a material such as rubber or foam rubber in order to impart the feeling of softness of living tissue.

1 Claim, 5 Drawing Figures

MULTIPURPOSE FISHING DEVICE

CROSS REFERENCE TO A RELATED APPLICATION

This appliction is a Continuation-In-Part of my copending application, Ser. No. 457,624 filed Apr. 3, 1974 and now abandoned.

BACKGROUND OF THE INVENTION

1. Field of the Invention

This invention relates generally to a fishing accessory and more particularly to a multipurpose fishing device, that has the characteristics of a lure, a float, a sinker and/or a chum box.

2. Description of the Prior Art

Multipurpose fishing devices or accessories are well known in the art. However, as will be evident from the description that follows hereinafter, none of the prior art is capable of combining the several different characteristics of the present invention.

One example of a typical form of the prior art is disclosed in U.S. Pat. No. 2,112,385 granted to H. F. Smith on Mar. 29, 1938. The Smith patent discloses a two part fishing lure wherein the forward section is secured to the rearward section by means of mating threads. The rearward section includes an hermetically sealed air chamber while a combination of the rearward and forward sections define means for storing live bait. Both the rearward and the forward sections of this prior art device are perforated so that bait may be dispensed therethrough. However, no provisions are made in the Smith patent for varying the weight in the hermetically sealed air chamber. That is, ballast cannot be added to or taken away from the sealed air chamber. Moreover, the Smith patent does not teach or suggest the use of fins for hydrodynamically controlling the movement of the device through the water.

Still another example of the prior art in this field is disclosed in U.S. Pat. No. 2,983,065 issued on May 9, 1961, to W. C. Fergurson et al., which teaches a two-part fishing lure and with which interchangeable accessories may be used. The rearward section of the Fergurson et al. structure is perforated so that the bait accommodated therein may flow outwardly. Ballast means may be contained in the forward section. However, the Fergurson et al. patent does not teach the use of a fluid impermeable seal between the two chambers as will be discussed hereinafter in connection with the present invention. While the Fergurson et al. patent does disclose the use of movable fins it should be clearly noted that these fins are freely rotatable and are not adjustably fixed at preselected positions as will become more evident from the following description of the present invention.

U.S. Pat. No. 2,696,061 granted to W. Swenson and dated Dec. 7, 1954, also teaches the use of rotatable fins. However the Swenson patent neglects the other characteristics of the present invention. Similarly, U.S. Pat. Nos. 2,532,879 and 1,249,194 granted to L. W. Baker and G. A. Race on Dec. 5, 1950, and Dec. 4, 1917, respectively, also teach several of the features incorporated in the present invention. That is, these last two mentioned U.S. patents disclose, respectively, piston means for discharging the fluid content of a bait chamber and fixed guide fins. However, these prior art patents do not suggest the total combination of structure that is characteristic of the present invention.

SUMMARY OF THE INVENTION

The present invention provides a multipurpose fishing device that exhibits the characteristics of a lure, a float, a sinker and/or chum box. The structure defined by the present invention includes two separate, coaxially arranged sections that are threadably secured to each other. The forward section is perforated so that the bait material contained therein may be dispensed through the perforations by means of a piston that is axially movable, the piston being attached to the fishing line that extends through a small hole in the extreme forward end of the forward section.

The rear section of the present invention is adapted to contain varying quantities of ballast such as sand, water, rock or lead and the rear section is fluidly isolated from the forward section by means of a transverse gasket. The rear section also includes four external hydrodynamic fins, two of which are fixed and the other two of which are adjustable for control purposes. A plurality of fixed accessory terminals for the attachment of various appendages are also provided. The forward and rear sections may be made of any suitable, non-corrosive material such as rubber, plastics, synthetic resins and/or suitable metals with the external surfaces thereof having a material that imparts the feeling of softness of living tissue. The advantage of the present invention over the prior art is that any one or all of the characteristics disclosed may be provided in a single device.

Accordingly, it is a primary object of the present invention to provide an improved multipurpose fishing device.

It is another object of the present invention to provide an improved, multipurpose fishing device, as described above, that may function as a lure, a float, a sinker and/or a chum box, as required.

A feature of the present invention is the provision of seal means that fluidly isolates the forward and rearward sections of the device.

An advantage of the present invention is the provision of external, fish attractive colors as well as surface materials that are attractive to fish.

These and other objects, features and advantages of the invention will, in part, be pointed out with particularity and will, in part, become obvious from the following more detailed description of the invention taken in conjunction with the accompanying drawing, which forms an integral part thereof.

BRIEF DESCRIPTION OF THE DRAWING

In the various figures of the drawing, like reference characters designate like parts. In the drawing.

DESCRIPTION OF THE PREFERRED EMBODIMENT

Figure 1:
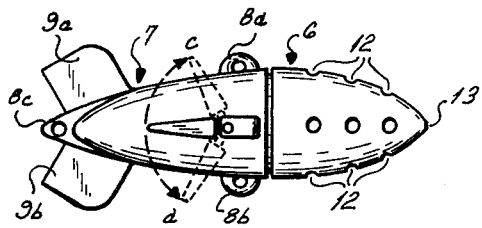
FIG. 1 is a plan view illustrating one embodiment of the present invention with a component thereof shown in a second position in phantom outline.
Figure 3:
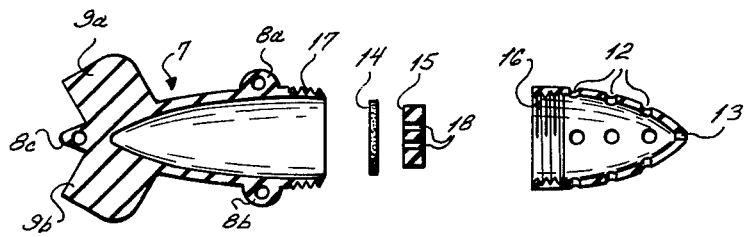
FIG. 3 is a longitudinal, sectional, exploded view of the embodiment of this invention shown in FIG. 1 and in FIG. 2.

Referring first to FIGS. 1 and 3, it will be seen that the rear section 7 is hollow. The rear section 7 may be comprised of a suitable non-corrosive material such as rubber, plastic, synthetic resin or an appropriate metal. The rear section 7 is provided with an upper, fixed rear hydrodynamic fin 9a and a lower fixed, rear hydrodynamic fin 9b. Hydrodynamically, the fins 9a and 9b are designed to stabilize the forward drive in a horizontal direction when the device is pulled through the water in certain applications. In other applications, the fins 9a and 9b also serve to reduce current drifting when bottom fishing by digging into the soft sand. The rear section 7 is also provided with an upper accessory terminal 8a, a lower accessory terminal 8b and a rear accessory terminal 8c. These terminals 8a, 8b and 8c are used discriminately for selected attachments in specific applications.

Figure 2:
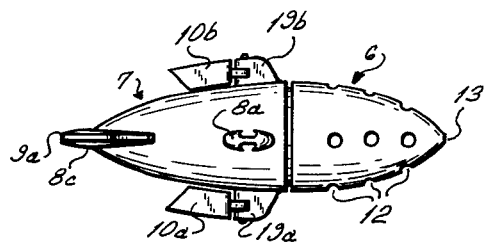
FIG. 2 is a side elevational view of the structure shown in FIG. 1.

The rear section 7 is also provided with adjustable hydrodynamic fins on the sides thereof. As shown for example in FIG. 2, fin 10a is positioned on the right hand side and the fin 10b is positioned on the left hand side. The adjustable fin 10a is shown in the neutral or level position in FIG. 1 and in fixed, alternate positions in phantom outline. The fin 10a may be moved manually to any desired angle outlined by the broken line between the letters c and d in FIG. 1. Although not specifically illustrated, it should be clearly understood that the adjustable fin 10b may be moved through the same arc as the adjustable fin 10a. A simple manual setting is made possible through a mechanism inside the fixed forward sections 19a and 19b, respectively, which will be described hereinafter. The various fixed angle settings of the adjustable fins 10a and 10b provide the fisherman with individual choice selection and development of hydrodynamic maneuverability skills.

The forward section or stimulation chamber 6 may be comprised of either the same materials described in connection with the rear section 7 or with different materials. The forward section 6 has no external structure and, as shown particularly in FIG. 3, is hollow. The wall of the forward section 6 is perforated by means of at least one but preferably a plurality of holes 12 in order to facilitate the propagation of the fish enticement material contained therein to the outside area. On the extreme front end of the forward section 6, a smaller hole 13 is provided for purposes to be discussed hereinafter.

As shown in FIG. 3, the rear section 7 has only one open end and is provided with external threads 17. The forward section or stimulation chamber 6 has mating internal threads 16. Both chambers or sections 6 and 7 may be joined and separated by the threads 16 and 17. In certain appplications, the ballast chamber defined by the rear section 7 may be sealed empty or full or partially full with ballast, depending upon the particular application. This is accomplished by means of an isolation or sealing disc 14 which is comprised of a soft, non-corrosive material that is fluid impermeable. The disc 14 is relatively thin, being approximately 1/32nd of an inch thick. The outside diameter of the disc 14 is approximately the same as the open end of the ballast chamber defined by the rear section 7. When the disc 14 is inserted and pressed between both sections 6 and 7 by the threads 16 and 17, it will seat on the inside ridge of the stimulation chamber defined by the forward section 6 and form a water tight seal. By virtue of at least this unique feature, the several different, diverse applications of the present invention are made possible.

A dispensing piston 15, which is shown in FIG. 3, may be comprised of a non-corrosive material that is approximately one-eighth inch thick. The outside diameter of the piston 15 is smaller than the inside diameter of the stimulation chamber defined by the forward section 6 thereby allowing the piston 15 to move axially throughout almost the entire length of the stimulation chamber. The piston 15 is also provided with axially oriented, radially spaced apart openings 18 that allow for the attachment of a line from the fishing pole or a baited hook leader depending upon the application of the device. The purpose of the piston 15 is to translate the various bait materials outwardly through the openings 12. Several different means for dispensing the bait material may be used. That is, by pulling hard on the fishing line with the pole in certain applications, such as surf fishing, trolling, or bottom fishing. Another method for dispensing the bait material is by the fish pulling on the baited hook and leader and nibbling at the bait. A third form of bait discharge is by normal dissipation of the bait material itself in a water environment in all applications. Although not specifically illustrated, the access hole 13 is always used for attachment to the piston.

Figure 4:
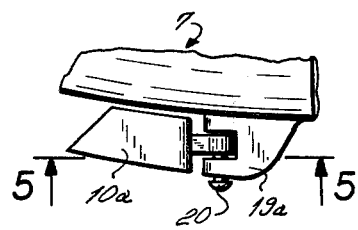
FIG. 4 is an enlarged, fragmentary elevational view, illustrating one structural feature of the present invention.
Figure 5:
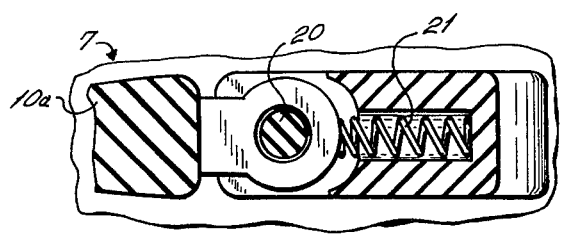
FIG. 5 is a fragmentary section bottom plan view taken along line 5—5 of FIG. 4.

Referring now to FIG. 4 there is shown an enlarged view illustrating the right side hydrodynamic fin assembly 10a and 19a. The rear section of the assembly, that is the fin 10a, is designed to manually swivel on an axis pin 20 to any desired angle setting and is automatically held in the selected position by the constant pressure of the spring 21 which is shown in FIG. 5. The spring tension should be selected so that it is sufficiently high to hold the fin 10a in the selected position after the manual adjustment has been made and also while the device is in the water. The spring 21 may be replaced, if required by pulling the pin 20 out of the fixed front section 19a. As shown in FIG. 5, the adjustable fin assembly has a clevis-type arrangement and the pin 20 is press-fit through both sections.

There has been disclosed heretofore the best embodiment of the invention presently contemplated. However, it is to be understood that various changes and modifications may be made thereto without departing from the spirit of the invention.

I claim:

1. A multipurpose fishing device comprising, in combination:
   a. a body portion including a perforated forward section that is adapted to function as a bait chamber and a fluid impermeable rearward section that is adapted to function as a ballast chamber;
   b. means for removably securing said forward and said rearward sections to each other;
   c. means transversely interposed between said forward and said rearward sections for sealing and isolating said rearward section from said forward section;
   d. a plurality of fins mounted on the external surface of said rearward section; at least some of said fins being adjustably positioned and said adjustably positioned fins are comprised of a fixed section and a movable section and a clevis joint coupling said two sections there being further included a compression spring having a first end bearing against said fixed section and a second end bearing against said movable section and include means for securing said adjustable fins in any one of a plurality of different positions;

e. means for attaching at least one hook to said rearward section; and
f. piston means in said forward section for selectively discharging the contents thereof.

* * * * *